(12) United States Patent
Dreier

(10) Patent No.: US 8,132,335 B2
(45) Date of Patent: Mar. 13, 2012

(54) APPARATUS FOR CHECKING THE ACCURACY OF A CIRCULAR PATH OF A MACHINE TOOL PERFORMED BY A WORK SPINDLE AND/OR A MACHINE TABLE

(75) Inventor: Horst Dreier, Horb am Neckar (DE)

(73) Assignee: Dreier Lasermesstechnik GmbH, Horb (DE)

( * ) Notice: Subject to any disclaimer, the term of this patent is extended or adjusted under 35 U.S.C. 154(b) by 0 days.

(21) Appl. No.: 12/902,634

(22) Filed: Oct. 12, 2010

(65) Prior Publication Data

US 2011/0083337 A1    Apr. 14, 2011

Related U.S. Application Data

(60) Provisional application No. 61/251,319, filed on Oct. 14, 2009.

(30) Foreign Application Priority Data

Oct. 14, 2009   (DE) .......................... 10 2009 045 688

(51) Int. Cl.
*B23B 49/00* (2006.01)
*B23Q 17/00* (2006.01)

(52) U.S. Cl. ............................................ 33/502; 33/642

(58) Field of Classification Search .................... 33/502, 33/573, 626, 642, 706, 707, 708
See application file for complete search history.

(56) References Cited

U.S. PATENT DOCUMENTS

| | | | |
|---|---|---|---|
| 5,111,590 A | 5/1992 | Park | |
| 5,533,271 A | 7/1996 | Callaghan, Jr. | |
| 5,813,128 A * | 9/1998 | Bailey | 33/502 |
| 6,944,965 B1 * | 9/2005 | Watamura | 33/642 |
| 7,296,955 B2 * | 11/2007 | Dreier | 33/642 |
| 7,464,478 B2 * | 12/2008 | Adrian | 33/642 |
| RE42,082 E * | 2/2011 | Raab et al. | 33/503 |
| 2007/0137059 A1 | 6/2007 | Holzapfel et al. | |
| 2007/0163136 A1 * | 7/2007 | Eaton | 33/502 |

FOREIGN PATENT DOCUMENTS

| | | |
|---|---|---|
| DE | 29512250 U1 | 11/1995 |
| DE | 102008005384 A1 | 7/2009 |
| EP | 0 526 056 A1 | 2/1993 |
| EP | 0 803 710 A2 | 10/1997 |
| EP | 1826642 A1 | 8/2007 |

OTHER PUBLICATIONS

Mitutuyo: "Mitutuyo Catalog No. E2004-Measuring Instruments Catalog", Jan. 1, 1999, p. 335: Linear Scales for Numerical Motion Control System.

* cited by examiner

*Primary Examiner* — G. Bradley Bennett
(74) *Attorney, Agent, or Firm* — Henry M. Feiereisen; Ursula B. Day

(57) ABSTRACT

An apparatus for checking the accuracy of a circular path of a work spindle or a machine table, in particular an NC-controlled machine tool, includes a clamping element coaxial with the work spindle, a first rotary bearing disposed on the clamping element and coaxial with the rotation axis of the work spindle, a measurement arm with a first pivot bearing having a first pivot axis orthogonal to the rotation axis of the clamping element, a length measurement system disposed in measurement arm with a glass rod with a marking and a reading device, an adjusting device receiving the measurement arm and having a second pivot bearing with a pivot axis aligned parallel to the first pivot axis, a second rotary bearing having a second rotation axis aligned parallel to the rotation axis of the work spindle, and a stator supporting the second rotary bearing.

15 Claims, 3 Drawing Sheets

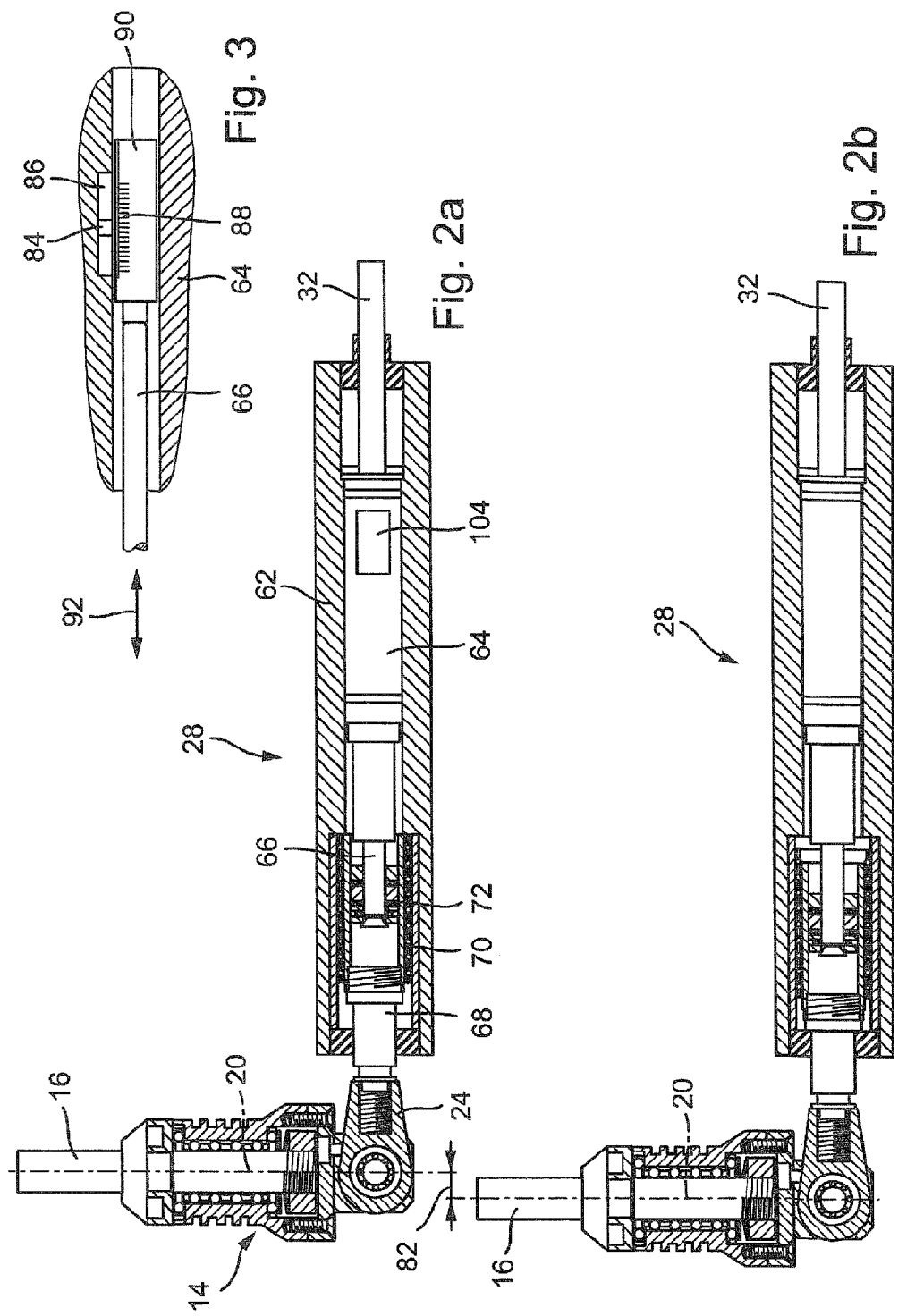

APPARATUS FOR CHECKING THE ACCURACY OF A CIRCULAR PATH OF A MACHINE TOOL PERFORMED BY A WORK SPINDLE AND/OR A MACHINE TABLE

CROSS-REFERENCES TO RELATED APPLICATIONS

This application claims the priority of German Patent Application, Serial No. 10 2009 045 688.0, filed Oct. 14, 2009, pursuant to 35 U.S.C. 119(a)-(d), the content of which is incorporated herein by reference in its entirety as if fully set forth herein.

This application claims the benefit of prior filed U.S. provisional Application No. 61/251,319, filed Oct. 14, 2009, pursuant to 35 U.S.C. 119(e), the content of which is incorporated herein as if fully set forth herein.

BACKGROUND OF THE INVENTION

The invention relates to a apparatus for checking the accuracy of a circular path of a machine tool performed by a work spindle and/or a machine table, in particular an NC-controlled machine tool, with a clamping element coaxially attached on the work spindle, a first rotary bearing attachable to the clamping element with a rotation axis coaxial to the work spindle and an orthogonal pivot axis for a first pivot bearing, a measurement arm having the pivot bearing, an adjusting device receiving the measurement arm with a second pivot bearing having a pivot axis parallel to the pivot axis of the first pivot bearing, a second rotary bearing with a rotation axis oriented parallel to the work spindle, and a stator supporting the second rotary bearing, wherein a length measurement system for determining a radial deviation of the work spindle from a circular path is provided in the measurement arm.

It would therefore be desirable and advantageous to provide an improved apparatus to obviate prior art shortcomings and to perform more precise measurements.

SUMMARY OF THE INVENTION

According to one aspect of the present invention, an apparatus for checking the accuracy of a circular path to be performed by a work spindle or a machine table, such as an NC-controlled machine tool, includes a clamping element which is coaxially attached on the work spindle, a first rotary bearing attached on the clamping element and having a first rotation axis coaxial with a rotation axis of the work spindle, a measurement arm with a first pivot bearing having a first pivot axis orthogonal to the rotation axis of the clamping element, a length measurement system disposed in measurement arm and comprising a glass rod with a marking and a reading device for determining a radial deviation of the work spindle from a circular path, an adjusting device receiving the measurement arm and having a second pivot bearing with a pivot axis aligned parallel to the first pivot axis, a second rotary bearing having a second rotation axis aligned parallel to the rotation axis of the work spindle, and a stator supporting the second rotary bearing.

Advantageously, a length measurement system with a glass rod and a reading device has a negligibly small drift deviation of <1 μm for a measurement length of 5 mm. The temperature-related change in length of the glass rod is negligibly small and the reading device is arranged so that changes in its dimensions have no effect at all or only a small effect. When the measurement arm is in a horizontal position, the reading device is located in the vertical rotation axis of the second rotary bearing, neutralizing a change in length. The circular path can here be measured in each of the three planes (X-, Y- and Z-plane).

According to the invention, the glass rod is attached to a pin connected to the first pivot bearing. Alternatively, the glass rod may also be attached via a support on the adjusting device. Conversely, according to the invention, the reading device may be attached via a support on the adjusting device. Alternatively, the reading device may also be attached on a pin connected with the first pivot bearing. Accordingly, either the glass rod or the reading device can be moved.

In one embodiment of the invention, the glass rod may be provided with a code facing the reading device, in particular with a line code. This line code forming the marking may be applied on the glass rod with a very high resolution, for example by etching or printing, and is read by the reading device.

If, as in one exemplary embodiment, the reading device is an optical device, then the data measurement is performed without making contact and is therefore not subject to wear and is unaffected by faults.

To keep the susceptibility to faults as small as possible, the measurement arm may have an electronic device for digitizing the measured data. These data may be transmitted via a wired connection.

In another advantageous exemplary embodiment, the apparatus may be a time measurement device for linking the measured data with time. In this way, time differences between the trigger signals may be measured in addition to the radial deviation.

To be able to transmit the measured values without interference and without loss, the rotating unit may have a transmitter and/or receiver for wireless transmission of data to the stator and/or to an external transmitter and/or receiver. This operation may be performed during the measurement or after the measurement is concluded.

According to another advantageous embodiment of the invention, the stator may have a transmitter and/or receiver for wireless transmission of data to an external transmitter and/or receiver. The data may then be processed in an external facility, and the memory in the stator may be deleted.

In yet another advantageous exemplary embodiment, the transmitter and/or receiver may operate via radio transmission or according to the Bluetooth standard.

According to another advantageous embodiment of the invention, the stator may include a device, in particular an encoder for measuring the rotation speed of the second rotary bearing. Advantageously, a memory device for storing the speed data measured by the device may be provided in the stator. According to an advantageous embodiment, the stator may include an evaluation device for correlating the speed data and the data of the length measurement system. In addition to a measurement of the pure circular shape, the synchronized speed of the work spindle may also be measured. Advantageously, it can thereby be determined based on this measurement if the measured circular error is caused by the electric drives, the electronics and/or the mechanical system of the machine tool.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2a shows a longitudinal cross-sectional view through the measurement arm in a first measurement position;

FIG. 2b shows a longitudinal cross-sectional view through the measurement arm in a second measurement position;

FIG. 3 shows a longitudinal cross-sectional view through the length measurement system according to the invention.

DETAILED DESCRIPTION OF PREFERRED EMBODIMENTS

Figure 1:
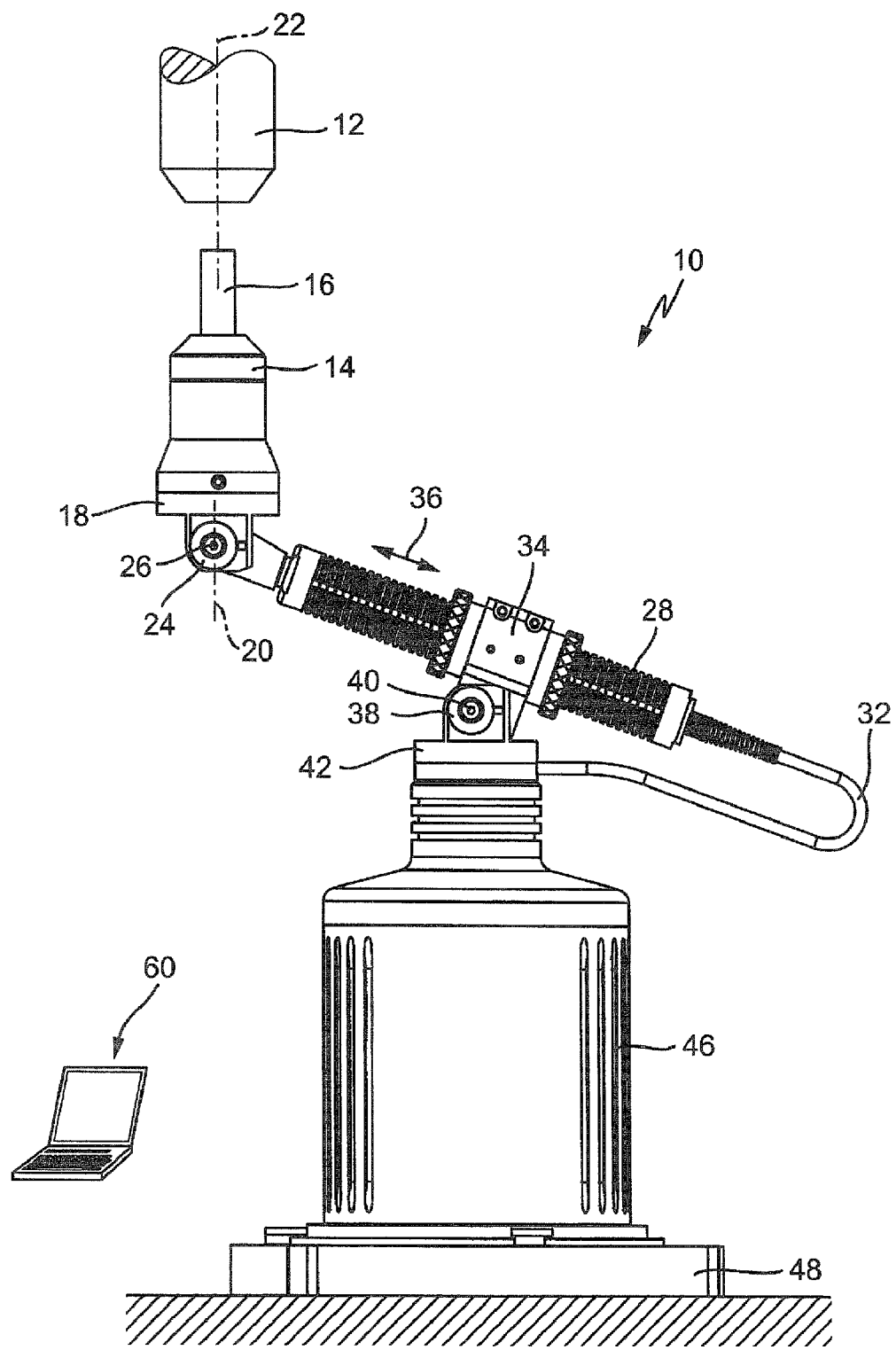
FIG. 1 shows a side view of a preferred embodiment of the measurement apparatus according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the following, an exemplary embodiment will be described where a circular path of a work spindle is measured. This is to be understood only as an example. The exemplary apparatus can also be used to measure movable machine tables.

Turning now to the drawing, and in particular to FIG. 1, there is shown a test apparatus indicated by the reference symbol 10, which can be used to measure the true running or the radial deviation from a circular path of a machine tool. The test apparatus 10 has a clamping element 14 with a clamping member 16 which is coaxially attached on the work spindle 12, so that the clamping element 14 travels along the circular path to be measured. The clamping element 14 has a rotary bearing 18 with a rotation axis 20 that is aligned coaxially with the rotation axis 22 of the work spindle 12. A pivot bearing 24 with a pivot axis 26 that is orthogonal to the rotation axis 20 is located below the rotary bearing 18. A measurement arm 28 is attached to the pivot axis 26. The measurement arm 28 is secured in an adjusting device 34 and can be moved in the adjusting device 34 in the direction of the double arrow 36 and fixed in position.

A pivot bearing 38 with a pivot axis 40 extending parallel to the pivot axis 26 is also provided on the adjusting device 34. A second rotary bearing 42 is located below the pivot bearing 38, with the rotation axis 44 of the second rotary bearing 42 being orthogonal to the pivot axis 40 and extending parallel to the rotation axis 20 of the rotary bearing 18 and to the rotation axis 22 of the work spindle 12. The rotary bearing 42 is held by a stator 46 which can be attached to a clamping plate 48 which is seated on a machine table 50 of the machine tool to be measured.

The radial deviation from the circular path of the work spindle 12 rotating about the stator 46 or its rotation axis 44 is measured and digitized in the measurement arm 28, which will be described in more detail below.

Figure 4:
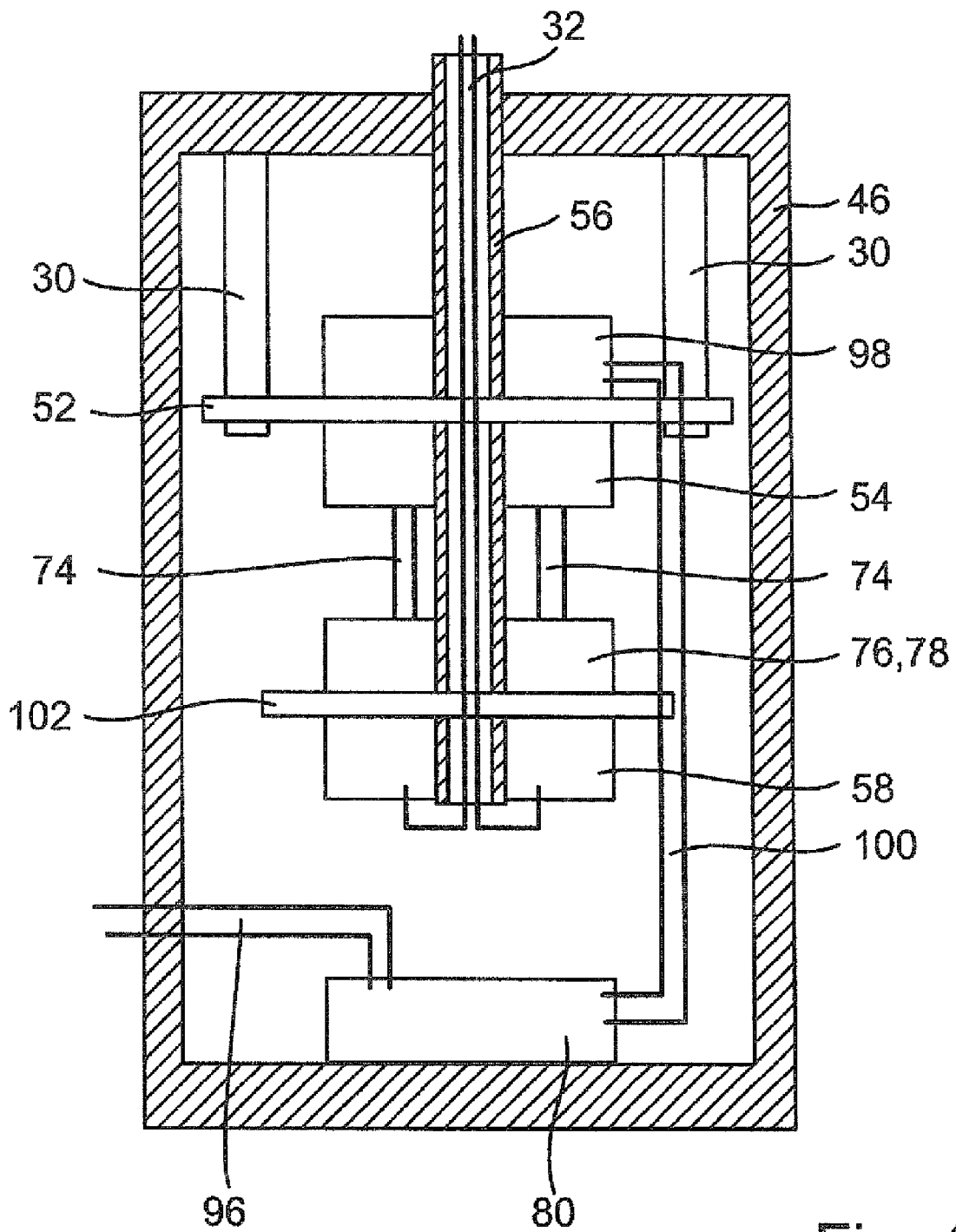
FIG. 4 shows a vertical section through the stator.

As illustrated in FIG. 4, a plate 52 is attached with two spacer bolts 30 in the stator 46 opposite to an encoder 54. This encoder 54 is seated on a hollow shaft 56 forming the rotation axis 44, in which the cable 32 is routed to evaluation electronics 58. The synchronized speed about the rotation axis 44 is measured with the encoder 54. This encoder 54 is connected via lines 74 with an intermediate memory 76 which has a transmitter and/or receiver 78 for transmitting the data to a stationary transmitter and/or receiver 80 located at the bottom of the stator, which can then be used to transmit the data to an external unit 16, for example a notebook, a PC or another data processing system. This can also be done by using a line 96. As can be seen, the entire data processing is performed in components that rotate, i.e., that are connected with the shaft 56.

There is also no risk of data loss or data errors due to transmission errors and the like. In addition, processing is much faster since it is performed before the data transmission. Wireless transmission of the data, as opposed to transmission via a slip ring, is error-free.

Also attached to the stationary plate 52 is the stationary part of a slip ring 98, with the other part supported by the hollow shaft 56. The slip ring 98 is used to transmit the energy required for the measurement processes, with the energy being received via a line 100. The intermediate memory 76 and the transmitter and/or receiver 78 are supported by a plate 102 that is attached to the hollow shaft.

FIGS. 2a and 2b show a longitudinal cross-section through the measurement arm 28 which carries a length measurement system 64 in a housing 62 for two different measurement positions. The length measurement system 64 has a pin 66 with a free end coupled, for example with a screw, to a ram 68 which is connected with the pivot bearing 24. The ram 68 is supported by way of a longitudinal bearing 70 for easy movement in the direction of the double arrow 92 (FIG. 3) and has a torsional coupling 72. Also located in the measurement arm 28 is an electronic device, which is coupled to the cable 32, for digitizing the measured data.

For determining the radial deviation, the length measurement system 64, which is illustrated in detail in FIG. 3, includes a reading device 84, which is arranged in a support 86. The reading device 84 is used to read a marking 88 indicated schematically in FIG. 3 as a line code on a glass rod 90 which is also attached on the pin 66. This pin 66 moves in the direction of the double arrow 92, which for a horizontal measurement arm 28 corresponds to deviation 82. The data determined with the reading device 84 are processed in the electronic device 76 and transmitted via the transmitter and/or receiver 80. The length measurement system 64 according to the invention has the significant advantage that it operates without making contact and does not have a temperature-related drift.

In addition, up to five temperature sensors can be connected to the apparatus 10 according to the invention. The individual temperature sensors are connected via a cable having a length between 5 and 10 m to a separate interface with five inputs and a data output. A measurement board with a memory component is located in this interface. The interface is connected via a data line with the apparatus 10 according to the invention and with the microcomputer integrated therein. In long-term measurements, the measured values of the measurement of the circle are acquired, processed and stored in the microcomputer disposed in the apparatus 10. The microcomputer in the apparatus 10 then queries the current temperature values, depending on the program structure, before or after each individual measurement from the memory chip via the interface, wherein these temperature values are then also stored in the microcomputer of the apparatus 10. The measured values are then transmitted together with the temperature data to the evaluation unit, for example a notebook, where they are further processed and stored.

A suitable temperature sensor sensing the ambient temperature can also be connected directly, for example via an RS-232 interface, with the evaluation unit, so that the temperature data can be queried directly. This temperature sensor can be used to measure the ambient temperature around the machine to be tested. In this way, you can be determined to which degree in the ambient temperature affects the machine temperature.

The temperature sensors are magnetic and can be attached at different locations on the machine, measuring the temperature at these locations. In this way, you can be determined which component heats up and is hence responsible for the measurement offset.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An apparatus for checking an accuracy of a circular path to be performed by a work spindle or a machine table, comprising:
    a clamping element which is coaxially attached on the work spindle,
    a first rotary bearing attached on the clamping element and having a first rotation axis coaxial with a rotation axis of the work spindle,
    a measurement arm with a first pivot bearing having a first pivot axis orthogonal to the rotation axis of the clamping element,
    a length measurement system disposed in measurement arm and comprising a glass rod with a marking and a reading device for determining a radial deviation of the work spindle from a circular path,
    an adjusting device receiving the measurement arm and having a second pivot bearing with a pivot axis aligned parallel to the first pivot axis,
    a second rotary bearing having a second rotation axis aligned parallel to the rotation axis of the work spindle, and
    a stator supporting the second rotary bearing.

2. The apparatus of claim 1, wherein the work spindle or a machine table is part of an NC-controlled machine tool.

3. The apparatus of claim 1, wherein the glass rod is attached via a support on the adjusting device or on a pin connected with the first pivot bearing.

4. The apparatus of claim 1, wherein the reading device is attached via a support on the adjusting device or on a pin connected with the first pivot bearing.

5. The apparatus of claim 1, wherein the marking is a line code.

6. The apparatus of claim 1, wherein the reading device is an optical device.

7. The apparatus of claim 1, wherein the measurement arm comprises an electronic device for digitizing the data measured by the reading device.

8. The apparatus of claim 7, further comprising a measuring board for attachment of the electronic device.

9. The apparatus of claim 1, further comprising a first transmitter and/or receiver connected with the measurement arm for wireless transmission of data to the stator or to an external transmitter and/or receiver, or both.

10. The apparatus of claim 1, wherein the stator comprises a second transmitter and/or receiver for wireless transmission of data to an external transmitter and/or receiver.

11. Apparatus according to claim 9, wherein the first transmitter and/or receiver operates by way of radio transmission or according to the Bluetooth standard.

12. Apparatus according to claim 10, wherein the second transmitter and/or receiver operates by way of radio transmission or according to the Bluetooth standard.

13. The apparatus of claim 1, wherein the stator comprises a device an encoder for measuring a rotation speed of the second rotary bearing.

14. The apparatus of claim 13, wherein the stator comprises a memory device for storing rotation speed data.

15. The apparatus of claim 14, wherein the stator comprises an evaluation device which correlates the rotation speed data and data measured by the length measurement system.

* * * * *